United States Patent [19]
Iizuka et al.

[11] Patent Number: 5,142,869
[45] Date of Patent: Sep. 1, 1992

[54] CLOSED CYCLE TYPE HEAT ENGINE

[75] Inventors: Souichi Iizuka, Tokyo; Yasuharu Yamada, Chiba, both of Japan

[73] Assignee: Technical Associate Co., Ltd., Tokyo, Japan

[21] Appl. No.: 771,495

[22] Filed: Oct. 4, 1991

[30] Foreign Application Priority Data

Jun. 28, 1991 [JP] Japan .................................. 3-183924

[51] Int. Cl.⁵ ............................................... F02C 1/04
[52] U.S. Cl. ......................................... 60/684; 60/650
[58] Field of Search ........................... 60/650, 682, 684

[56] References Cited
FOREIGN PATENT DOCUMENTS 59-51655 12/1984 Japan .

*Primary Examiner*—Allen M. Ostrager
*Attorney, Agent, or Firm*—Flynn, Thiel, Boutell & Tanis

[57] ABSTRACT

A small-sized closed cycle type heat engine capable of efficiently recovering the working medium gas. The closed cycle type heat engine comprises a shaft having one end on which a first reduction gear is mounted, a second reduction gear meshing with the first reduction gear and connected to a generator, a compressor mounted on the other end of the shaft, front, middle and rear gas turbines sequentially coaxially mounted on the shaft, first to fourth heat exchangers for communicating with the front, middle and rear gas turbines so that the working medium gas in the front, middle and rear gas turbines is subjected to the thermal expansion and pressure expansion, thereby improving the recovery of the working medium gas.

3 Claims, 1 Drawing Sheet

CLOSED CYCLE TYPE HEAT ENGINE

BACKGROUND OF THE INVENTION

1. Field of the Invention

The present invention relates to a closed cycle type heat engine, particularly to a small-sized heating engine capable of effectively recovering a working medium gas.

2. Description of the Related art

A conventional closed cycle gas turbine of this type is disclosed in Japanese Patent Publication No. 59-51655. This gas turbine has a heater to effect a combustion air under pressure wherein the difference between the pressure of the working medium gas which cycles in the turbine (hereinafter referred to as cycle gas) at the heated side and the pressure of the combustion gas at the heating side is reduced, thereby heating the cycle gas at the high temperature. As a result, the temperature of the cycle gas is increased at the inlet of the gas turbine.

In a large scaled plant including the closed cycle type gas turbine, a compressor coaxially mounted on the turbine is driven to increase the pressure and the temperature for revolving the turbine. The reflux hot gas from the gas turbine is heat-exchanged in its heat and the temperature of the reflux gas is further decreased by a pre-cooler and supplied to a compressor where the pressure of the reflux gas is increased. Thereafter, the temperature of the reflux gas is increased. Consequently, the energy in the reflux gas is once lost which causes the problem in view of the thermal efficiency. Although the heat can be recovered by a different method in the more large scaled plant, the heat can be hardly recovered in the small scaled plant, thereby reducing the thermal efficiency.

SUMMARY OF THE INVENTION

It is an object of the present invention to provide a closed cycle type heat engine adapted for a small-sized plant and capable of effectively recovering the heat of the working medium gas.

To achieve the object of the present invention, the closed cycle type heat engine for pressurizing and heating a heat working substance such as the working medium gas in a sealed container to thereby revolve gas turbines so as to take out the power from the gas turbines is characterized in comprising a compressor mounted on one end of a shaft, front, middle, and rear gas turbines respectively coaxially mounted on the shaft, first, second and third heat exchangers each provided at outlet sides of the front, middle and the rear turbines for thereby communicating with an inlet side and the outlet side of each turbine, a combustion furnace interposed between the first heat exchanger provided at the outlet side of the front gas turbine and the third heat exchanger provided at the outlet side of the rear gas turbine wherein the third heat exchanger communicates with an air blower and the inlet side of the compressor, and a fourth heat exchanger interposed between an outlet side of the compressor and the inlet side of the front gas turbine for communicating with the first and second heat exchangers. The heat of the working medium gas is effectively recovered by the heat expansion and pressure expansion by three stages of the gas turbines.

DESCRIPTION OF THE PREFERRED EMBODIMENT

Figure 1:
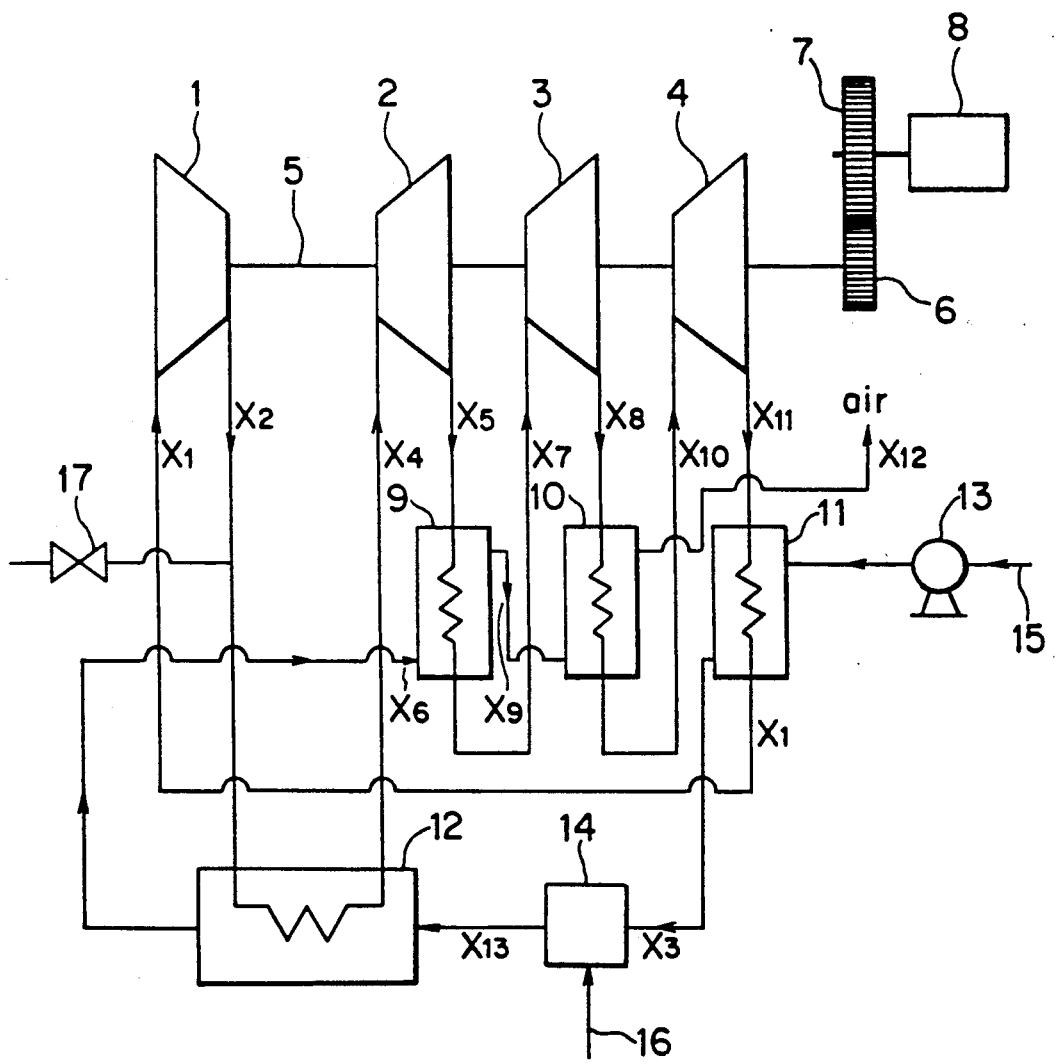
FIG. 1 shows an arrangement of a closed cycle type heat engine according to a preferred embodiment of the present invention.

A closed cycle type heat engine according to a preferred embodiment of the present invention will be described with reference to FIG. 1.

Denoted at 1 is a compressor, 2, 3 and 4 are front, middle and rear gas turbines respectively coaxially and sequentially arranged on a shaft 5. One of reduction gears 6 and 7 is mounted on the other end of the shaft 5 and the other reduction gear is connected to a generator 8. Denoted at 9, 10, 11 and 12 are first, second, third and fourth heat exchangers, 13 is an air blower communicating with the third heat exchanger 11, 14 is a combustion furnace communicating with the fourth heat exchanger 12, 15 is a fresh air supply route and 16 is a fuel supply route. Designated at 17 is a blow valve.

The first heat exchanger 9 is disposed for communicating with the outlet side of the front gas turbine 2 and with the inlet side of the middle gas turbine 3 while the second heat exchanger 10 is disposed for communicating with the outlet side of the middle gas turbine 3 and the inlet side of the rear gas turbine 4. The third heat exchanger 11 is disposed for communicating with the outlet side of the rear gas turbine 4 and the inlet side of the compressor 1. The fourth heat exchanger 12 is disposed between the compressor 1 and the front gas turbine 2 for communicating with the outlet side of the compressor 1 and the inlet side of the front gas turbine 2. The fourth exchanger 12 further communicates with the first heat exchanger 9 and the second heat exchanger 10 so that the combustion by air and fuel generates a hot gas in the combustion furnace 14 and the hot gas is introduced into the first and second heat exchangers 9 and 10, and thereafter discharged to the atmosphere.

The operation of the closed cycle type heat engine will be described hereinafter.

The cycle gas enters the compressor 1 coaxially mounted on the shaft 5 which is driven by the front, middle and rear gas turbines 2 to 4 as shown in the arrow $X_1$ and is compressed to an appropriate pressure by the compressor 1. The pressurized gas enters the fourth exchanger 12 as shown in the arrow $X_2$.

Mixed and combusted in the combustion furnace 14 is the fuel which entered the combustion furnace 14 from the fuel supply route 16 and the air supplied from the fresh air supply route 15 which passed the air blower 13 and passed the third heat exchanger 11 where the air is compressed and has the amount greater than the theoretical amount and entered the combustion furnace 14 as shown in the arrow $X_3$. The combusted mixture of the fuel and the air forms the hot gas which enters the fourth exchanger 12 as shown in the arrow $X_{13}$. The cycle gas is heated and expanded by the hot gas and enters the front gas turbine 2 as shown in the arrow $X_4$, thereby revolving the front gas turbine 2 to generate the power.

The gas discharged from the outlet side of the front gas turbine 2 as shown in the arrow $X_5$ is kept under the high temperature and the high pressure and enters the first heat exchanger 9. The cycle gas in the first heat exchanger 9 is heated by the hot gas which entered the first heat exchanger 9 from the fourth exchanger 12 as shown in the arrow $X_6$. The cycle gas discharged from the first heat exchanger 9 enters the middle gas turbine 3 as shown in the arrow $X_7$ and revolves the middle gas turbine 3. The cycle gas discharged from the middle gas turbine 3 enters the second heat exchanger 10 as shown in the arrow $X_8$. The cycle gas in the second heat exchanger 10 is heated by absorbing the hot gas which is discharged from the first heat exchanger 9 and enters the second heat exchanger 10 as shown in the arrow $X_9$. The cycle gas discharged from the second heat exchanger 10 enters the rear gas turbine 4 as shown in the arrow $X_{10}$ where the cycle gas is expanded. The cycle gas is discharged, after revolving the rear gas turbine 4, from the rear gas turbine 4 and enters the third heat exchanger 11 as shown in the arrow $X_{11}$ where the cycle gas is exchanged in its heat with the atmosphere supplied through the air blower 13 so as to lower the temperature thereof and thereafter introduced into the compressor 1 as shown in the arrow $X_1$.

The procedure of the operation is sequentially repeated. According to the present invention, the cycle gas is subjected to the thermal expansion and pressure expansion at three stages so that the cycle gas can be effectively recovered.

As the turbines are arranged in three stages coaxially on the shaft on which the compressor is mounted, it is possible to utilize the heat energy of the cycle gas as much as possible. Consequently, it is possible to recover the heat of the cycle gas with high efficiency since the temperature of the cycle gas is decreased to the point close to the normal temperature and introduced into the compressor without using the pre-cooler and the like as employed by the conventional closed type gas turbine cycle engine. The closed cycle heat engine according to the present invention is particularly adapted for the small-sized plant.

What is claimed is:

1. A closed cycle type heat engine in which a pressurized, heated working fluid is used to produce an output rotational force, comprising:
    a rotatably support shaft;
    a compressor for compressing working fluid, said compressor being mounted on said shaft and having an inlet and an outlet;
    first, second and third turbines supported coaxially relative to said shaft and drivingly engaged therewith for effecting rotation of said shaft in response to working fluid flowing through said turbines, each of said turbines having a working fluid inlet and a working fluid outlet;
    first, second and third heat exchangers respectively associated with said first, second and third turbines, each of said heat exchangers having a working fluid inlet and a working fluid outlet which communicate with one another, said working fluid inlet of each said heat exchanger communicating with said working fluid outlet of the associated turbine, said working fluid outlets of said first and second heat exchangers communicating respectively with said working fluid inlets of said second and third turbines, said working fluid outlet of said third heat exchanger communicating with said inlet of said compressor;
    a fourth heat exchanger having a working fluid inlet and a working fluid outlet which communicate with one another, said working fluid inlet of said fourth heat exchanger communicating with said outlet of said compressor, said working fluid outlet of said fourth heat exchanger communicating with said working fluid inlet of said first turbine;
    each of said heat exchangers having a further inlet and a further outlet which communicate with one another to permit fluid flow through the respective heat exchanger in heat exchange relationship with the working fluid therein, said further outlet of said fourth heat exchanger communicating with said further inlet of said first heat exchanger, and said further outlet of said first heat exchanger communicating with said further inlet of said second heat exchanger;
    a combustion furnace interposed between said third and fourth heat exchangers and having an input communicating with said further outlet of said third heat exchanger and an output communicating with said further inlet of said fourth heat exchanger;
    an air blower connected to said further inlet of said third heat exchanger for blowing air through said third heat exchanger in heat exchange relationship with the working fluid therein and out said further outlet of said third heat exchanger to said combustion furnace input; and
    said combustion furnace including means for using air provided at said input thereof to produce at said output thereof heated combustion gas which flows serially through said fourth, first and second heat exchangers in heat exchange relationship with the working fluid therein.

2. A heat engine according to claim 1, wherein said first turbine is a front turbine positioned closest to said compressor, said third turbine is a rear turbine positioned furthest from said compressor, and said second turbine is a middle turbine positioned axially between said front and rear turbines.

3. A heat engine according to claim 2, wherein said further outlet of said second heat exchanger communicates directly with ambient atmosphere.

* * * * *

UNITED STATES PATENT AND TRADEMARK OFFICE
CERTIFICATE OF CORRECTION

PATENT NO. : 5 142 869
DATED : September 1, 1992
INVENTOR(S) : Souichi Iizuka et al It is certified that error appears in the above-identified patent and that said Letters Patent is hereby corrected as shown below:

Column 3, line 42; change "support" to ---supported---.

Signed and Sealed this

Fifth Day of October, 1993

Attest:

BRUCE LEHMAN

Attesting Officer  Commissioner of Patents and Trademarks